United States Patent
Neubauer et al.

(10) Patent No.: US 8,056,596 B2
(45) Date of Patent: Nov. 15, 2011

(54) MULTIPLE PLY MODULAR CONSTRUCTION

(75) Inventors: Robert Anthony Neubauer, Medina, OH (US); Robert Allen Losey, Kent, OH (US); Keith Carl Trares, Akron, OH (US); Joseph Kevin Hubbell, Akron, OH (US); Ping Zhang, Hudson, OH (US); Robert Bernard Nelson, Wadsworth, OH (US); Cynthia Nelson, legal representative, Wadsworth, OH (US)

(73) Assignee: The Goodyear Tire + Rubber Company, Inc., Akron, OH (US)

( * ) Notice: Subject to any disclaimer, the term of this patent is extended or adjusted under 35 U.S.C. 154(b) by 503 days.

(21) Appl. No.: 11/876,303

(22) Filed: Oct. 22, 2007

(65) Prior Publication Data

US 2009/0101267 A1    Apr. 23, 2009

(51) Int. Cl.
*B60C 9/00* (2006.01)
*B60C 9/18* (2006.01)
*B60C 9/28* (2006.01)

(52) U.S. Cl. ........ 152/526; 152/534; 152/535; 152/538; 152/548; 152/552; 152/554; 152/555

(58) Field of Classification Search .................. 152/526, 152/530, 531, 532, 533, 534, 535, 536, 537, 152/538, 548, 550, 551, 552, 553, 554, 555
See application file for complete search history.

(56) References Cited

U.S. PATENT DOCUMENTS

| 3,451,461 A | * | 6/1969 | Wittneben ..................... 152/538 |
| 3,481,386 A | | 12/1969 | Menell et al. |
| 3,509,930 A | | 5/1970 | Mirtain |
| 3,580,318 A | | 5/1971 | Menell et al. |
| 3,960,194 A | | 6/1976 | Neale |
| 4,185,675 A | * | 1/1980 | Greiner et al. ................ 152/549 |
| 4,215,734 A | | 8/1980 | Suzuki et al. |
| RE30,549 E | | 3/1981 | Mirtain et al. |
| 4,257,469 A | | 3/1981 | Uemura |
| 4,265,292 A | | 5/1981 | Inoue |
| 4,310,041 A | | 1/1982 | Watts |
| 4,338,989 A | | 7/1982 | Sperberg |
| 4,340,105 A | | 7/1982 | Abe |
| 4,349,062 A | | 9/1982 | Tsurunaga et al. |
| 4,402,356 A | | 9/1983 | Musy |
| 4,442,880 A | | 4/1984 | Takahashi |
| 4,466,473 A | | 8/1984 | Matyja et al. |
| 4,770,222 A | | 9/1988 | Mezzanotte |
| 4,823,855 A | * | 4/1989 | Goergen et al. .......... 152/209.18 |
| 4,947,917 A | | 8/1990 | Noma et al. |

(Continued)

FOREIGN PATENT DOCUMENTS

DE         1921750         11/1970
(Continued)

*Primary Examiner* — Justin Fischer
(74) *Attorney, Agent, or Firm* — Roger D. Emerson; Timothy D. Bennett; Emerson Thomson Bennett

(57) ABSTRACT

A tire carcass to be used with any type of tire is shown herein. A tire carcass includes a first ply portion, a second ply portion, each ply portion having an inner sidewall ply, an outer sidewall ply, a first end, a second end, and a bead core, a bridge portion, wherein the first ends of the ply portions are separated by the bridge portion, and at least two bridge plies, wherein the bridge plies span the bridge portion, wherein each of the bridge plies have a first end and a second end.

20 Claims, 18 Drawing Sheets

U.S. PATENT DOCUMENTS

| | | | |
|---|---|---|---|
| 5,007,472 | A | 4/1991 | Kuze et al. |
| 5,015,315 | A | 5/1991 | Nakasaki |
| 5,025,845 | A | 6/1991 | Iino et al. |
| 5,368,082 | A | 11/1994 | Oare et al. |
| 5,372,172 | A | 12/1994 | Iseki |
| 5,385,193 | A * | 1/1995 | Suzuki et al. ............. 152/525 |
| 5,419,384 | A | 5/1995 | Iseki |
| 5,435,370 | A | 7/1995 | Ahmad et al. |
| 5,639,320 | A | 6/1997 | Oare et al. |
| 5,648,153 | A | 7/1997 | Sinopoli et al. |
| 5,685,927 | A | 11/1997 | Hammond et al. |
| 5,820,710 | A * | 10/1998 | Behnsen et al. ............. 152/541 |
| 5,851,324 | A | 12/1998 | Oare et al. |
| 5,871,600 | A | 2/1999 | Oare et al. |
| 6,021,829 | A | 2/2000 | Rooney |
| 6,082,423 | A | 7/2000 | Roesgen et al. |
| 6,263,935 | B1 | 7/2001 | Oare et al. |
| 6,305,452 | B1 | 10/2001 | Sato |
| 6,374,891 | B1 | 4/2002 | Allmond et al. |
| 6,415,840 | B1 * | 7/2002 | Nishikawa et al. ........... 152/458 |
| 6,422,279 | B1 | 7/2002 | Williams et al. |
| 6,510,883 | B2 | 1/2003 | Baumann et al. |
| 6,536,495 | B1 | 3/2003 | Close et al. |
| 6,688,357 | B1 | 2/2004 | Gerresheim et al. |
| 6,709,540 | B1 | 3/2004 | Oare et al. |
| 6,712,108 | B1 | 3/2004 | Koeune et al. |
| 6,883,570 | B2 | 4/2005 | Jardine et al. |
| 6,883,571 | B2 | 4/2005 | Jardine et al. |
| 6,913,052 | B2 | 7/2005 | Losey |
| 6,913,053 | B2 | 7/2005 | Reep et al. |
| 6,941,993 | B2 | 9/2005 | Billieres |
| 6,986,373 | B2 | 1/2006 | Gerresheim et al. |
| 6,997,224 | B2 | 2/2006 | Herbelleau et al. |
| 7,082,978 | B2 | 8/2006 | Sinopoli et al. |
| 7,104,301 | B2 | 9/2006 | Koeune et al. |
| 7,631,676 | B2 * | 12/2009 | Sandstrom et al. ........... 152/526 |
| 2001/0023730 | A1 | 9/2001 | Sinopoli et al. |
| 2002/0046795 | A1 | 4/2002 | Billieres |
| 2002/0112798 | A1 | 8/2002 | Larsen |
| 2002/0162616 | A1 | 11/2002 | Bernard et al. |
| 2003/0217801 | A1 | 11/2003 | Reep et al. |
| 2004/0016497 | A1 | 1/2004 | Morgan et al. |

FOREIGN PATENT DOCUMENTS

| | | |
|---|---|---|
| DE | 1605611 | 1/1971 |
| EP | 0650855 | 5/1995 |
| EP | 1475249 | 11/2004 |
| GB | 1596694 | 8/1981 |
| JP | 02155812 | 6/1990 |
| JP | 10157108 | 6/1998 |
| JP | 11-11109 | 1/1999 |
| NL | 7801877 | 8/1978 |
| NL | 8601104 | 12/1986 |
| WO | 0200451 | 1/2002 |

* cited by examiner ically to methods and apparatuses regarding tires, and more particularly to methods and apparatuses regarding two ply tires, and even more particularly to methods and apparatuses regarding two ply tires with multiple bridge plies.

MULTIPLE PLY MODULAR CONSTRUCTION

I. BACKGROUND OF THE INVENTION

A. Field of Invention

This invention pertains to the art of methods and apparatuses regarding tires, and more particularly to methods and apparatuses regarding two ply tires, and even more particularly to methods and apparatuses regarding two ply tires with multiple bridge plies.

B. Description of the Related Art

It is known in the art to construct a single modular ply tire for reduced weight and improved durability.

U.S. Pat. No. 6,913,052 discloses a tire construction and method of building a tire comprising the steps of cylindrically applying a pair of radial cord reinforced sidewall plies, fixing the axial spacing between the bead cores; applying a crown ply, turning up each sidewall ply and to overlap lateral edges of the crown ply; moving the carcass assembly axially inwardly while shaping the carcass assembly toroidially to form ply turnups axially inwardly of the bead cores. The method further comprises the steps of applying one or more belt reinforcing layers to the carcass and first reinforcing layer and applying a tread to form a pneumatic radial ply tread tire.

U.S. Pat. No. 6,883,571 discloses a tire comprising at least one reinforcement structure of carcass type anchored on each side of the tire in a bead, a crown reinforcement, sidewalls meeting up radially towards the outside with a tread, the carcass-type reinforcement structure extending circumferentially from the bead towards said sidewall and being discontinuous over at least a portion of the crown of the tire, said crown reinforcement comprising on the one hand at least one primary reinforcement structure covering substantially the entire width of the crown and on the other hand at least one series of circumferential reinforcements also covering substantially the entire width of the crown, said series of circumferential reinforcements comprising a portion of lateral circumferential reinforcements disposed radially to the outside relative to said primary reinforcement structures and a portion of median circumferential reinforcements disposed radially to the inside relative to said primary reinforcement structures.

U.S. Pat. No. 6,883,570 discloses a tire comprising at least one reinforcement structure of carcass type anchored on each side of the tire in a bead, a crown reinforcement, each bead being extended radially towards the outside by a sidewall, said reinforcement structure being discontinuous over at least a portion of the crown of the tire, said crown reinforcement comprising on the one hand at least one primary reinforcement structure covering substantially the entire width of the crown and comprising on the one hand, on each side of the tire, a lateral primary reinforcement structure portion disposed radially outside the adjacent carcass-type reinforcement structure portion and on the other hand a median primary reinforcement structure portion disposed radially more to the inside than the lateral primary reinforcement structure portions and at least one substantially axial row of median circumferential reinforcements disposed radially to the outside, substantially adjacent the median primary reinforcement structure portion.

II. SUMMARY OF THE INVENTION

According to one embodiment of this invention, a tire carcass includes a first ply portion, a second ply portion, each ply portion having an inner sidewall ply, an outer sidewall ply, a first end, a second end, and a bead core, a bridge portion, wherein the first ends of the ply portions are separated by the bridge portion, at least one bridge ply, wherein the at least one bridge ply spans the bridge portion, wherein of the at least one bridge ply has a first end and a second end.

According to another embodiment of this invention, the at least one bridge ply is at least two bridge plies, wherein the at least two bridge plies are layered on top of each other, wherein the bridge plies are on top of the outer sidewall ply.

According to another embodiment of this invention, wherein the at least one bridge ply is at least two bridge plies, wherein the at least two bridge plies are between the inner and outer sidewall plies.

According to another embodiment of this invention, wherein the at least one bridge ply is at least two bridge plies, wherein the at least two bridge plies are layered on top of each other, wherein the bridge plies are underneath the inner sidewall ply.

According to another embodiment of this invention, wherein the at least one bridge ply is at least two bridge plies, wherein at least one of the bridge plies is on top of the outer sidewall ply and at least one of the bridge plies is in between the inner and outer sidewall plies.

According to another embodiment of this invention, wherein the at least one bridge ply is at least two bridge plies, wherein at least one of the bridge plies is on top of the outer sidewall ply and at least one of the bridge plies is underneath the inner sidewall ply.

According to another embodiment of this invention, wherein the at least one bridge ply is at least two bridge plies, wherein at least one of the bridge plies is in between the inner and outer sidewall plies and at least one of the bridge plies is underneath the inner sidewall ply.

According to another embodiment of this invention, wherein the at least one bridge ply is at least three bridge plies, wherein at least one bridge ply is on top of the outer sidewall ply, at least one bridge ply in between the inner and outer sidewall plies, and at least one bridge ply is underneath the inner sidewall ply.

According to another embodiment of this invention, the first and second ends of each of the at least one bridge ply extends at least approximately one inch beyond the first end of the ply portions, extending toward the bead core.

According to another embodiment of this invention, wherein the at least one bridge ply is at least two bridge plies, wherein the first and second ends of each of the bridge plies extends between approximately one inch beyond the first end of the ply portions and approximately to the bead core.

According to another embodiment of this invention, wherein the at least one bridge ply is at least two bridge plies, wherein the first and second ends of each of the bridge plies extends between approximately two inches and approximately 5.5 inches beyond the first end of the ply portions, extending toward the bead core.

According to another embodiment of this invention, the at least one bridge ply is at least three bridge plies, wherein the bridge plies are layered on top of each other, wherein the bridge plies are on top of the outer sidewall ply.

According to another embodiment of this invention, the at least one bridge ply is at least three bridge plies, wherein the bridge plies are layered on top of each other, wherein the bridge plies are between the inner and outer sidewall plies.

According to another embodiment of this invention, the at least one bridge ply is at least three bridge plies, wherein the bridge plies are layered on top of each other, wherein the bridge plies are underneath the inner sidewall ply.

According to another embodiment of this invention, the at least one bridge ply is at least three bridge plies, wherein at least two of the bridge plies are on top of the outer sidewall ply and at least one of the bridge plies is in between the inner and outer sidewall plies.

According to another embodiment of this invention, the at least one bridge ply is at least three bridge plies, wherein at least two of the bridge plies are on top of the outer sidewall ply and at least one of the bridge plies is underneath the inner sidewall ply.

According to another embodiment of this invention, the at least one bridge ply is at least three bridge plies, wherein at least two of the bridge plies are in between the inner and outer sidewall plies and at least one of the bridge plies is underneath the inner sidewall ply.

According to another embodiment of this invention, the at least one bridge ply is at least three bridge plies, wherein at least two of the bridge plies are in between the inner and outer sidewall plies and at least one of the bridge plies is on top of the outer sidewall ply.

According to another embodiment of this invention, the at least one bridge ply is at least three bridge plies, wherein at least two of the bridge plies are underneath the inner sidewall ply and at least one of the bridge plies is in between the inner and outer sidewall plies.

According to another embodiment of this invention, the at least one bridge ply is at least three bridge plies, wherein at least two of the bridge plies are underneath the inner sidewall ply and at least one of the bridge plies is on top of the outer sidewall plies.

One advantage of this invention is that the bridge ply design allows greater flexibility for further tuning of the tire for ride and handling qualities.

Another advantage of this invention is that it saves tire weight versus conventional two-ply tires.

Yet another possible advantage of this invention is it increases plunger strength in the overlaps, particularly when multiple bridge plies are utilized.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DEFINITIONS

The following terms may be used throughout the descriptions presented herein and should generally be given the following meaning unless contradicted or elaborated upon by other descriptions set forth herein.

"Axial" and "axially" mean the lines or directions that are parallel to the axis of rotation of the tire.

"Carcass" means the tire structure apart from the belt structure, tread, undertread, and sidewall rubber over the plies, but including bead cores.

"Interior" means, generally, the inside surface of the tire.

"Exterior" means, generally, the outside surface of the tire.

"Overlap" means the distance of contact of the bridge ply and the sidewall plies.

"Pneumatic tire" means a laminated mechanical device of generally toroidal shape (usually an open-torus) having bead cores and a tread and made of rubber, chemicals, fabric and steel or other materials. When mounted on the wheel of a motor vehicle, the tire through its tread provides traction and contains the fluid that sustains the vehicle load.

"Radial" and "radially" mean directions toward or away from the axis of rotation of the tire.

"Sidewall" means that component which comprises a portion of the outside surface of a tire between the tread and the bead.

V. DETAILED DESCRIPTION OF THE INVENTION

Figure 1:
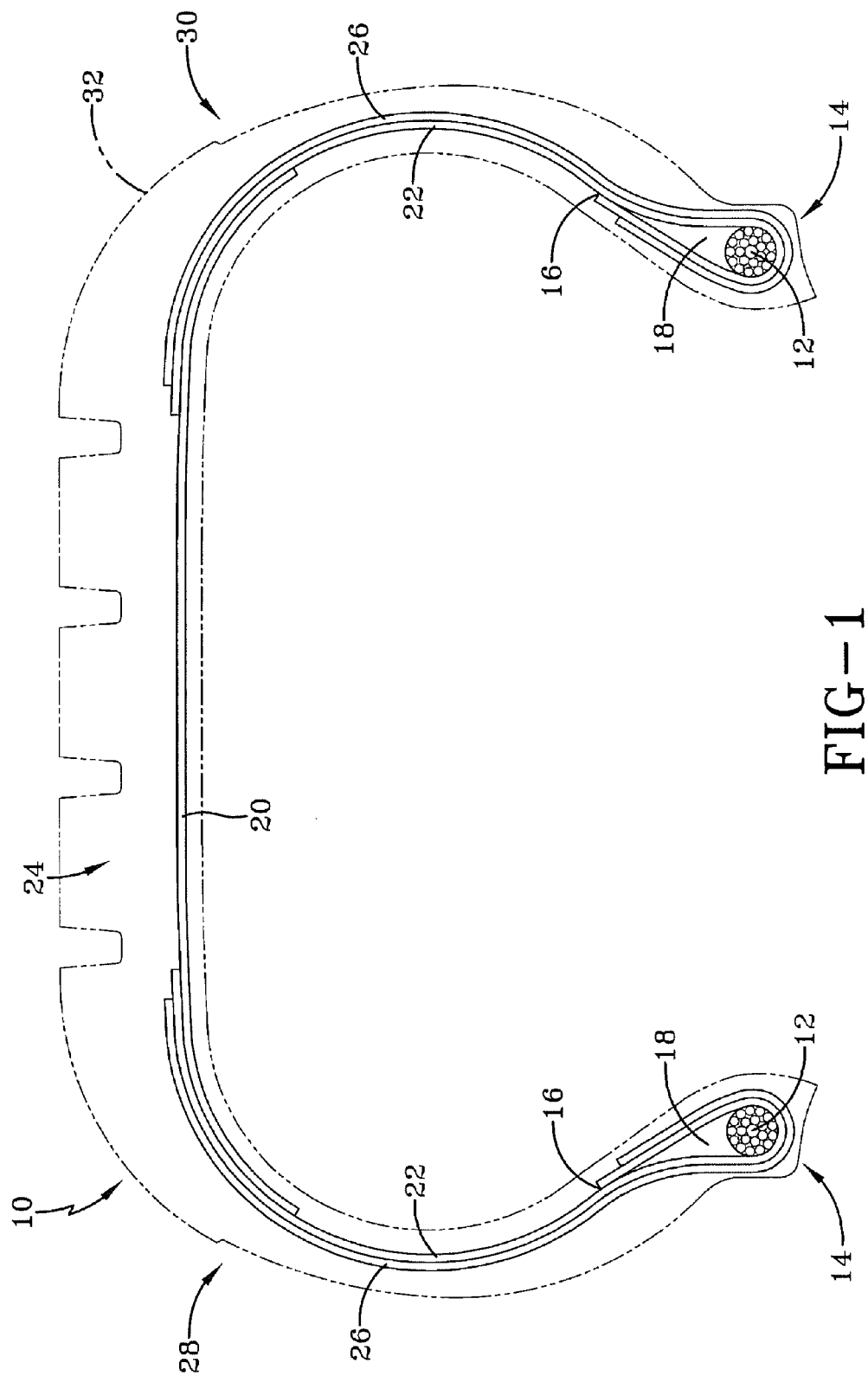
FIG. 1 is a cross-section of the ply-section of a tire, showing one bridge ply on the bottom.
Figure 2:
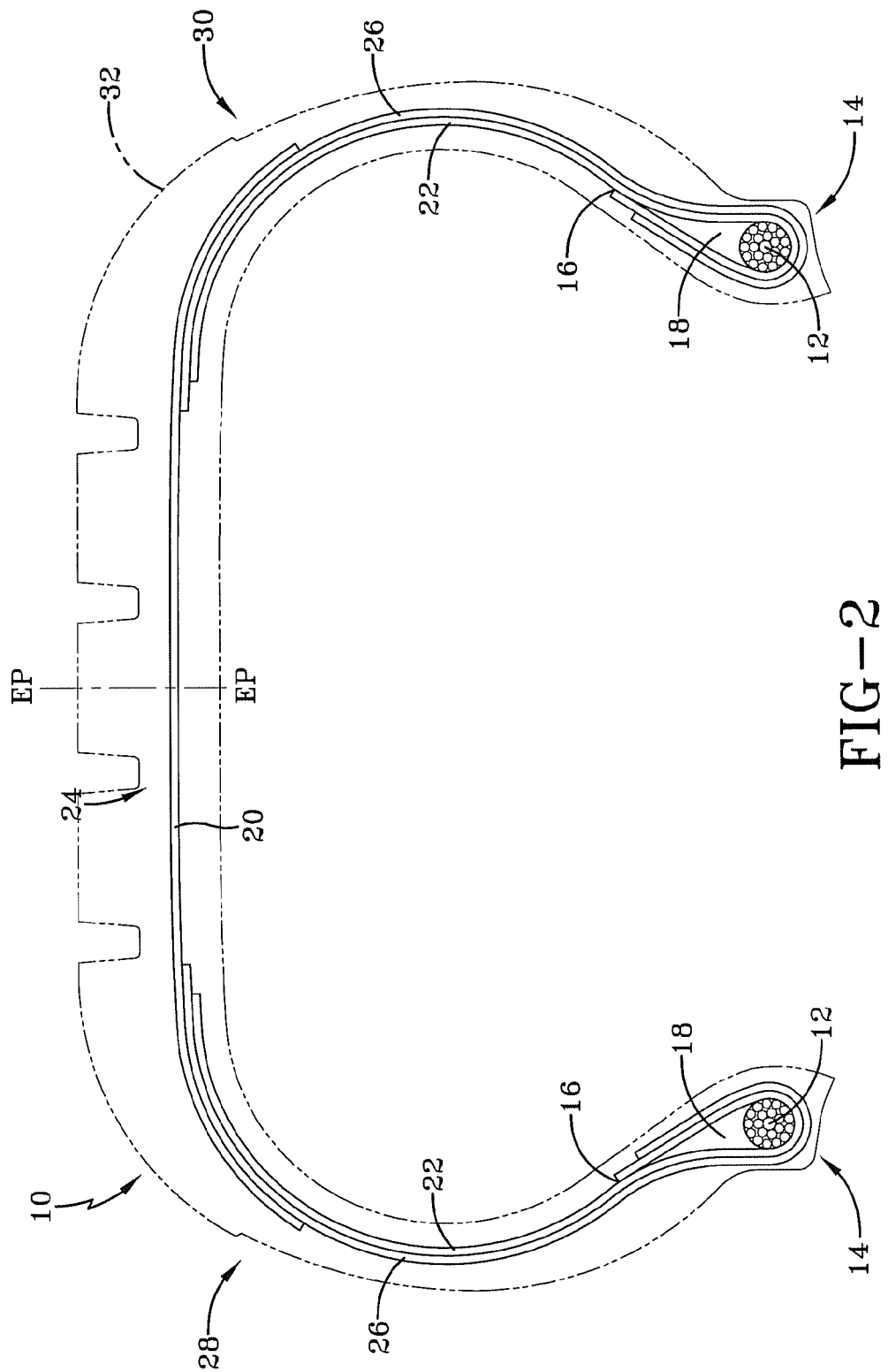
FIG. 2 is a cross-section of the ply-section of a tire, showing one bridge ply on top.

Referring now to the drawings wherein the showings are for purposes of illustrating embodiments of the invention only and not for purposes of limiting the same, FIGS. 1 and 2 show one bridge ply 20 spanning a bridge portion 24. This invention applies to both radial and bias tires.

With reference to FIGS. 3-18, the figures show a tire carcass 10, two beads 12, two bead regions 14, two turn-up ends 16, two apexes 18, multiple bridge plies 20, an inner sidewall ply 22, the bridge portion 24, an outer sidewall ply 26, a first ply portion 28, and a second ply portion 30. The bead regions 14 have a pair of axially spaced beads 12 around which are wrapped turn-up ends 16. The apexes 18 are sandwiched between the main body of the carcass 10 and the turn-up ends 16. The bridge portion 24 is an opening between the two ply portions 28, 30, defined by the first ends (shown but not referenced) of the ply portions 28, 30. As can be seen in the FIGURES, when the sidewall plies 22, 26 overlap, the plies 22, 26 are staggered, so that one ply 22, 26 is longer than the other. The bridge portion 24 is defined as the opening between the longer of the two plies 22, 26. The ply portions 28, 30 consist of an inner sidewall ply 22, with an outer sidewall ply 26 layered on top. The bridge plies 20 span the bridge portion 24. The bridge plies 20 overlap the ply portions 28, 30. In one embodiment of the invention, the overlap is between approximately one inch and up to the bead 12. In another embodiment of the invention, the overlap is between approximately two inches and approximately 5½ inches. In another embodiment of the invention, the overlap is between approximately four inches and approximately 4½ inches.

Figure 3:
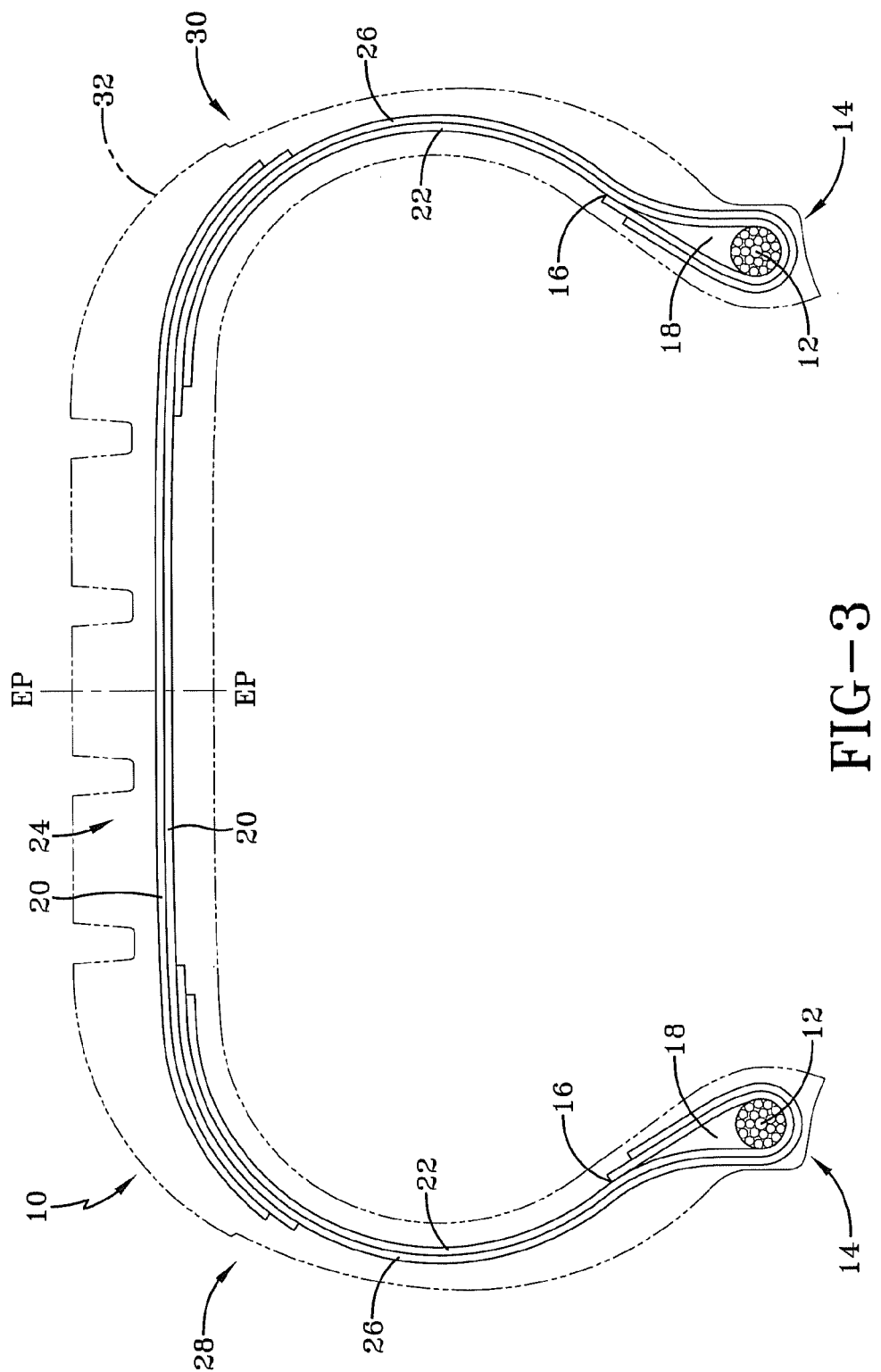
FIG. 3 is a cross-section of the ply-section of a tire, showing two bridge plies on top.
Figure 4:
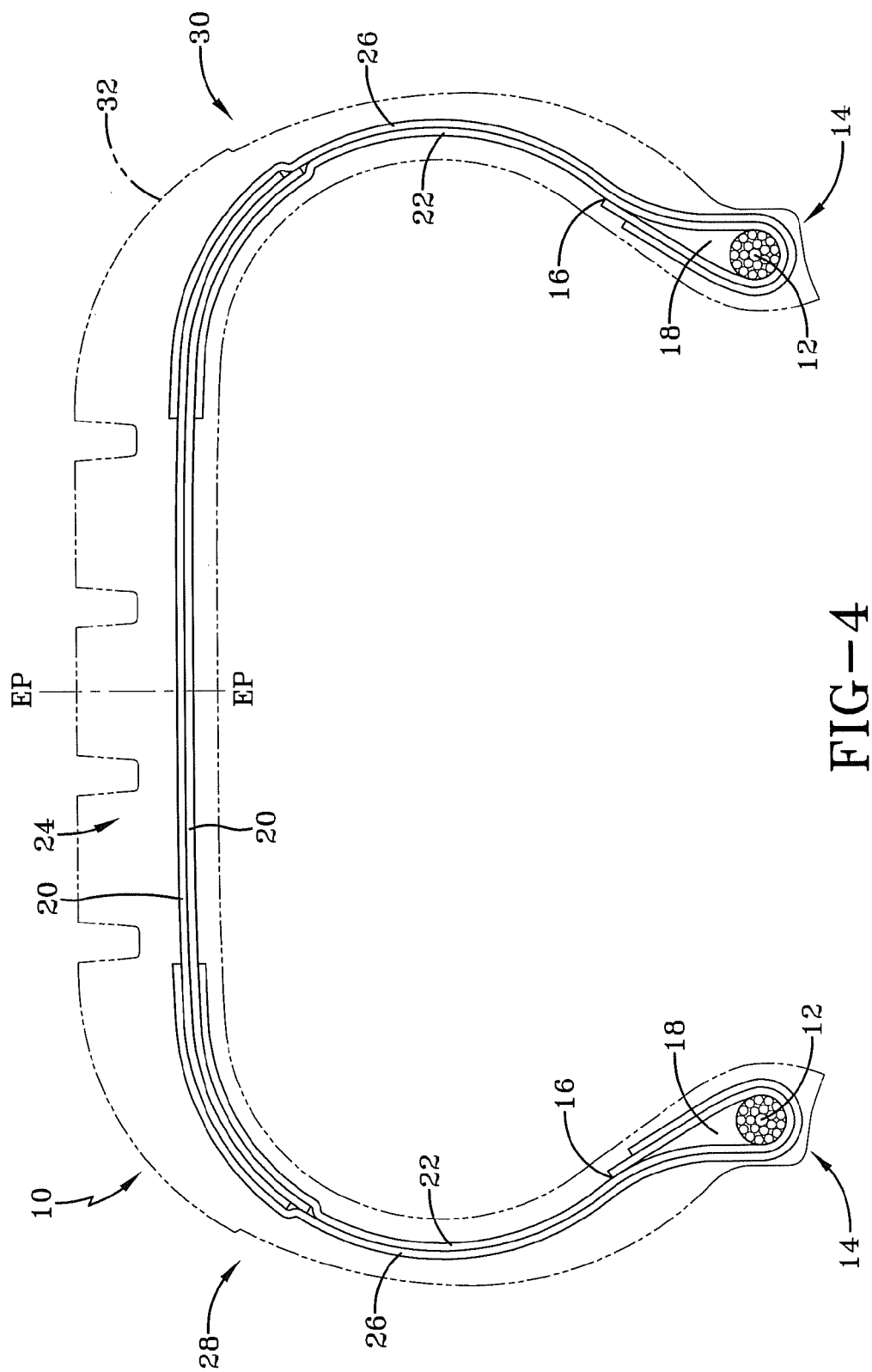
FIG. 4 is a cross-section of the ply-section of a tire, showing two bridge plies in the middle.
Figure 5:
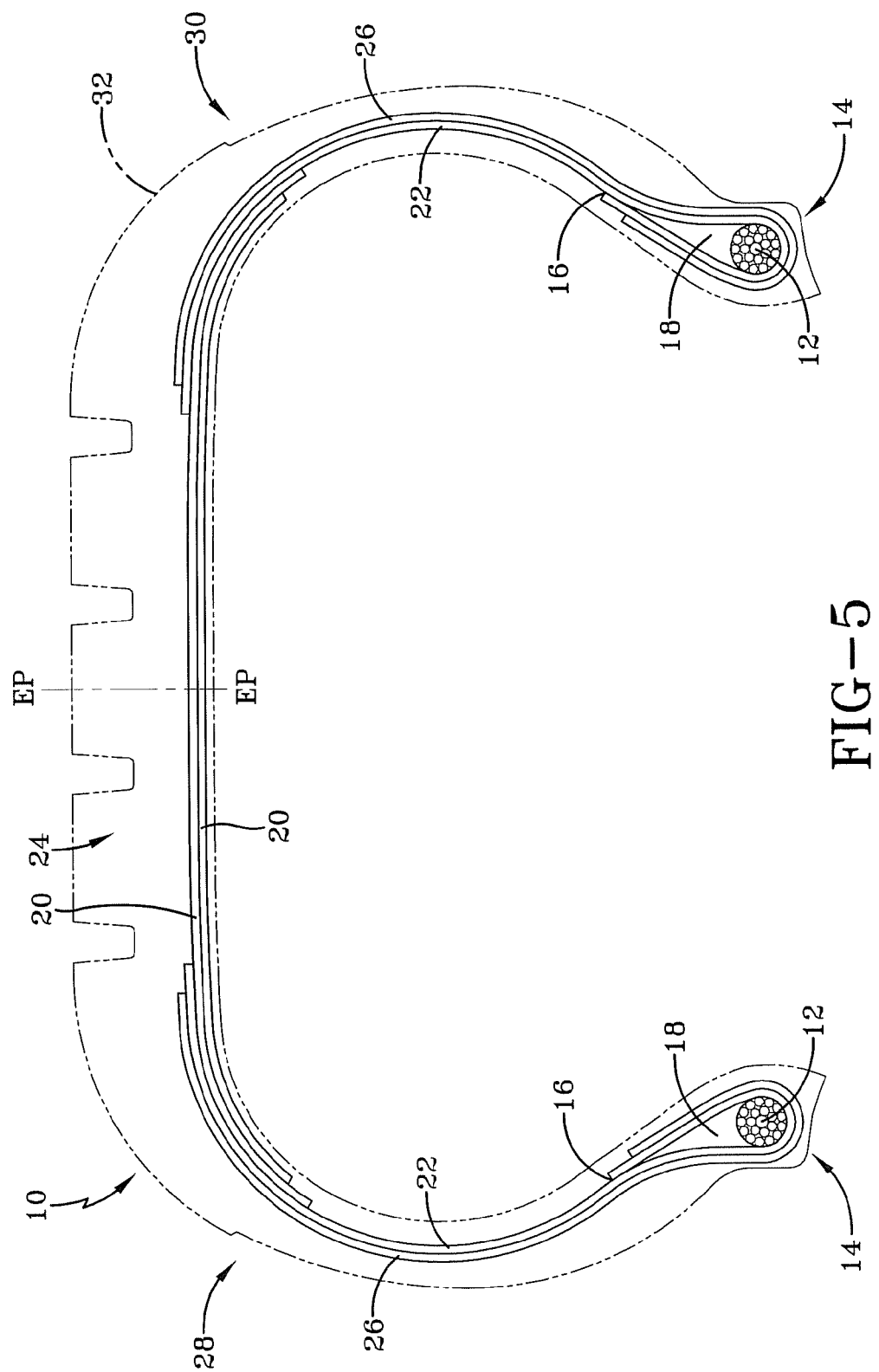
FIG. 5 is a cross-section of the ply-section of a tire, showing two bridge plies on the bottom.
Figure 6:
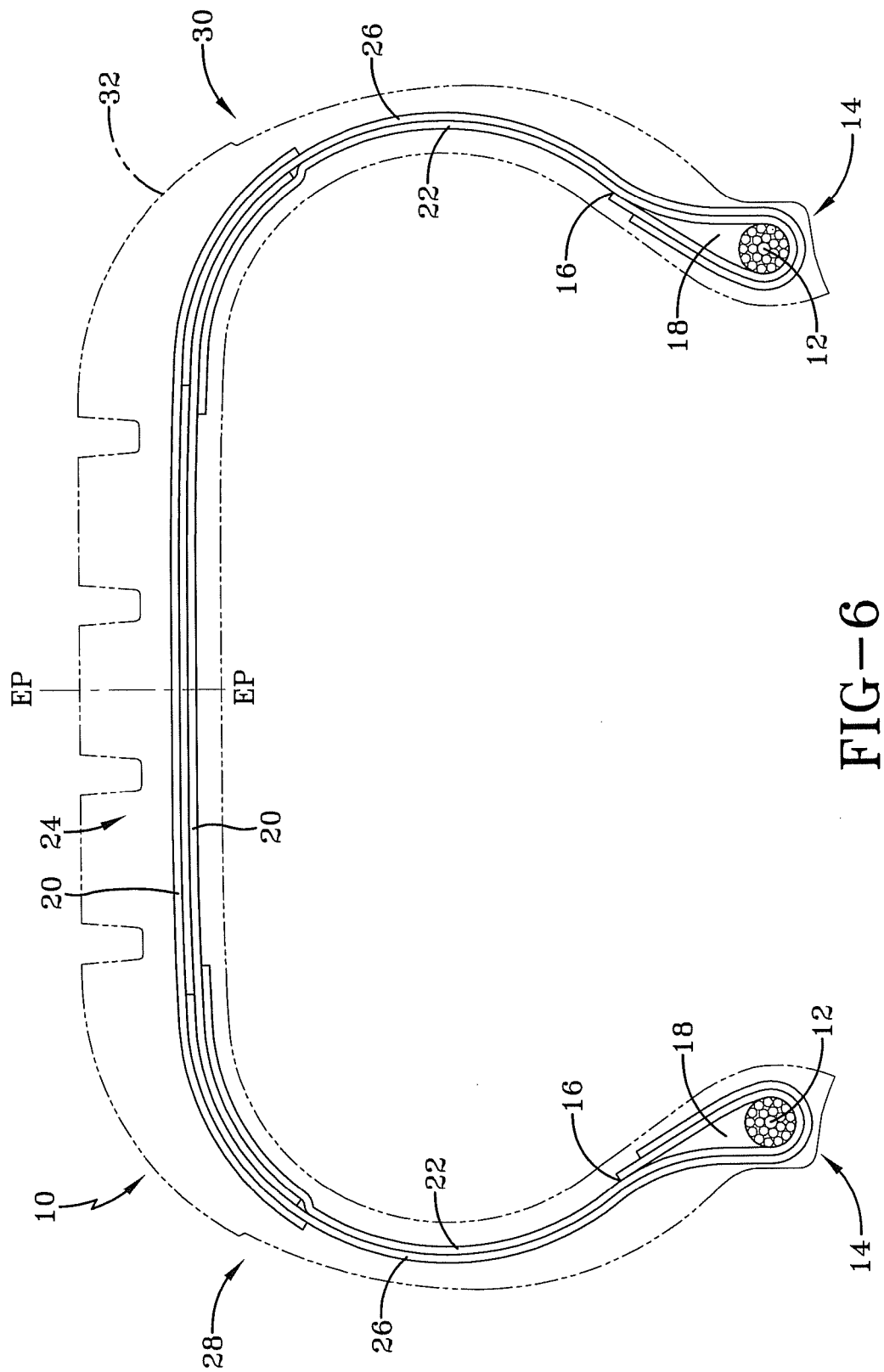
FIG. 6 is a cross-section of the ply-section of a tire, showing one bridge ply on top and one bridge ply in the middle.
Figure 7:
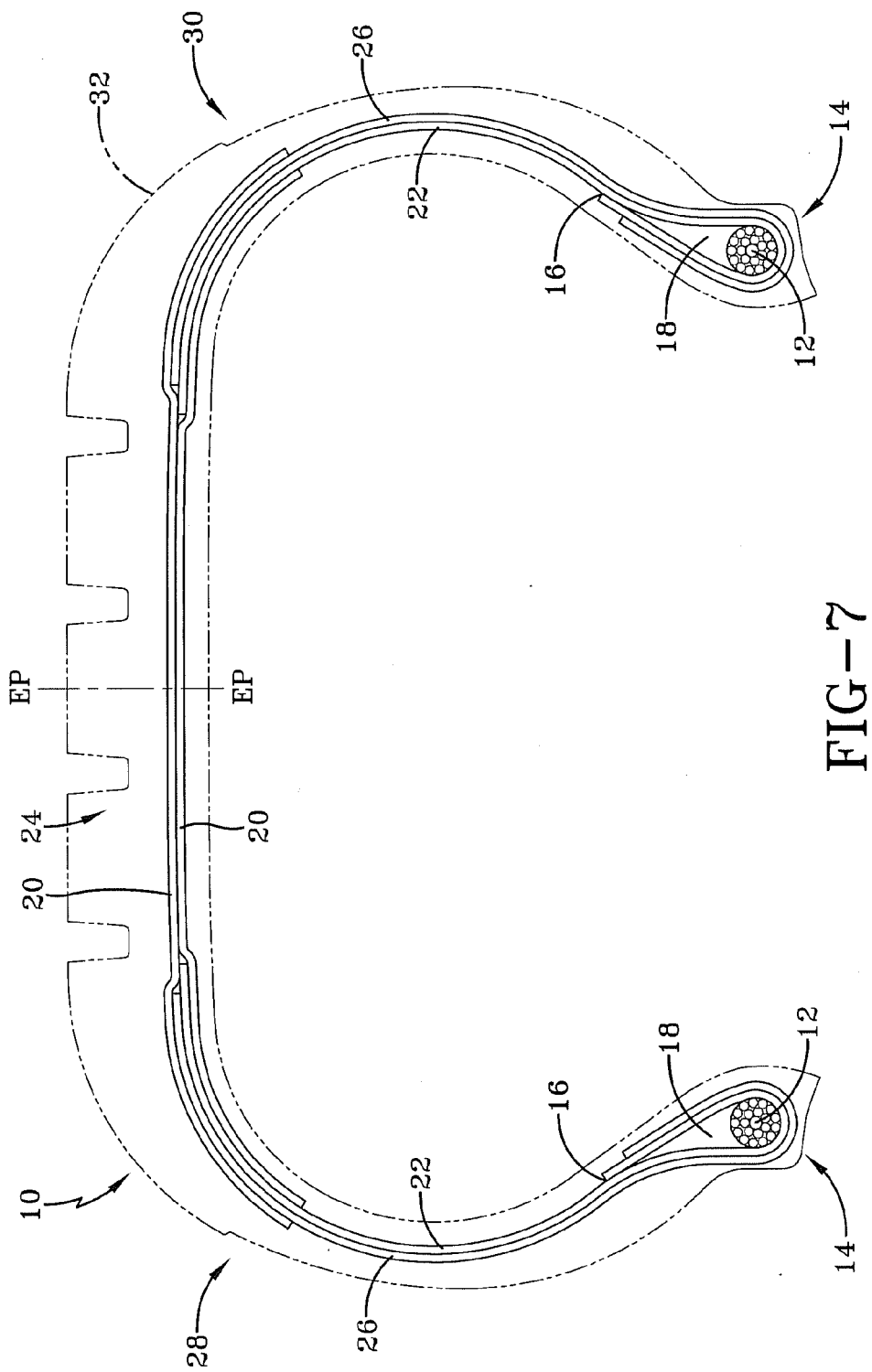
FIG. 7 is a cross-section of the ply-section of a tire, showing one bridge ply on top and one bridge ply on the bottom.
Figure 8:
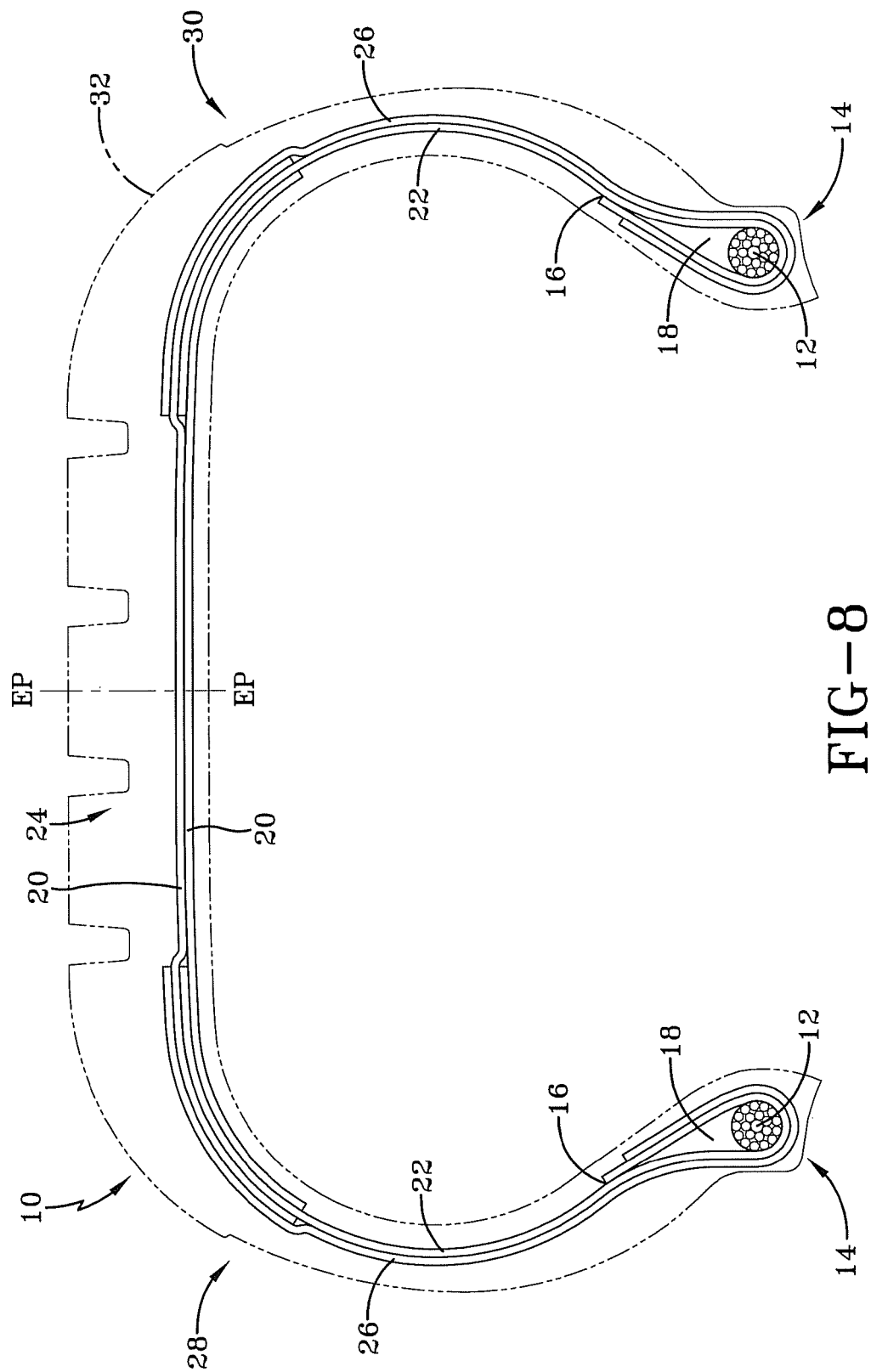
FIG. 8 is a cross-section of the ply-section of a tire, showing one bridge ply on the bottom and one bridge ply in the middle.

With reference now to FIGS. 3-8, in one embodiment of the invention, two bridge plies 20 span the bridge portion 24. In one embodiment of the present invention (as shown in FIG. 3) the two bridge plies 20 are on top of the outer side wall ply 26. In another embodiment of the present invention (as shown in FIG. 4) the two bridge plies 20 are in between the inner and outer side wall plies 22, 26. In another embodiment of the present invention (as shown in FIG. 5) the two bridge plies 20 are underneath the inner side wall ply 22. In another embodiment of the present invention (as shown in FIG. 6) one of the bridge plies 20 is on top of the outer sidewall ply 26, and the other bridge ply 20 is in between the inner and outer sidewall plies 22, 26. In another embodiment of the present invention (as shown in FIG. 7) one of the bridge plies 20 is on top of the outer sidewall ply 26 and the other bridge ply is underneath the inner sidewall ply 22. In another embodiment of the present invention (as shown in FIG. 8) one of the bridge plies 20 is in between the inner and outer sidewall plies 22, 26 and the other bridge ply 20 is underneath the inner sidewall ply 22. In one embodiment of the invention, the ends of the plies 20, 22, 26 and turn-up ends 16, when more than one ply 20, 22, 26 is on top of the other, are staggered. The stagger, in one embodiment, is between approximately 0.2 inches and 0.6 inches and in another embodiment is approximately 0.4 inches. It is to be understood that the staggering effect in the FIGURES is slightly exaggerated to show the staggering, since the staggering is typically less than one inch.

Figure 9:
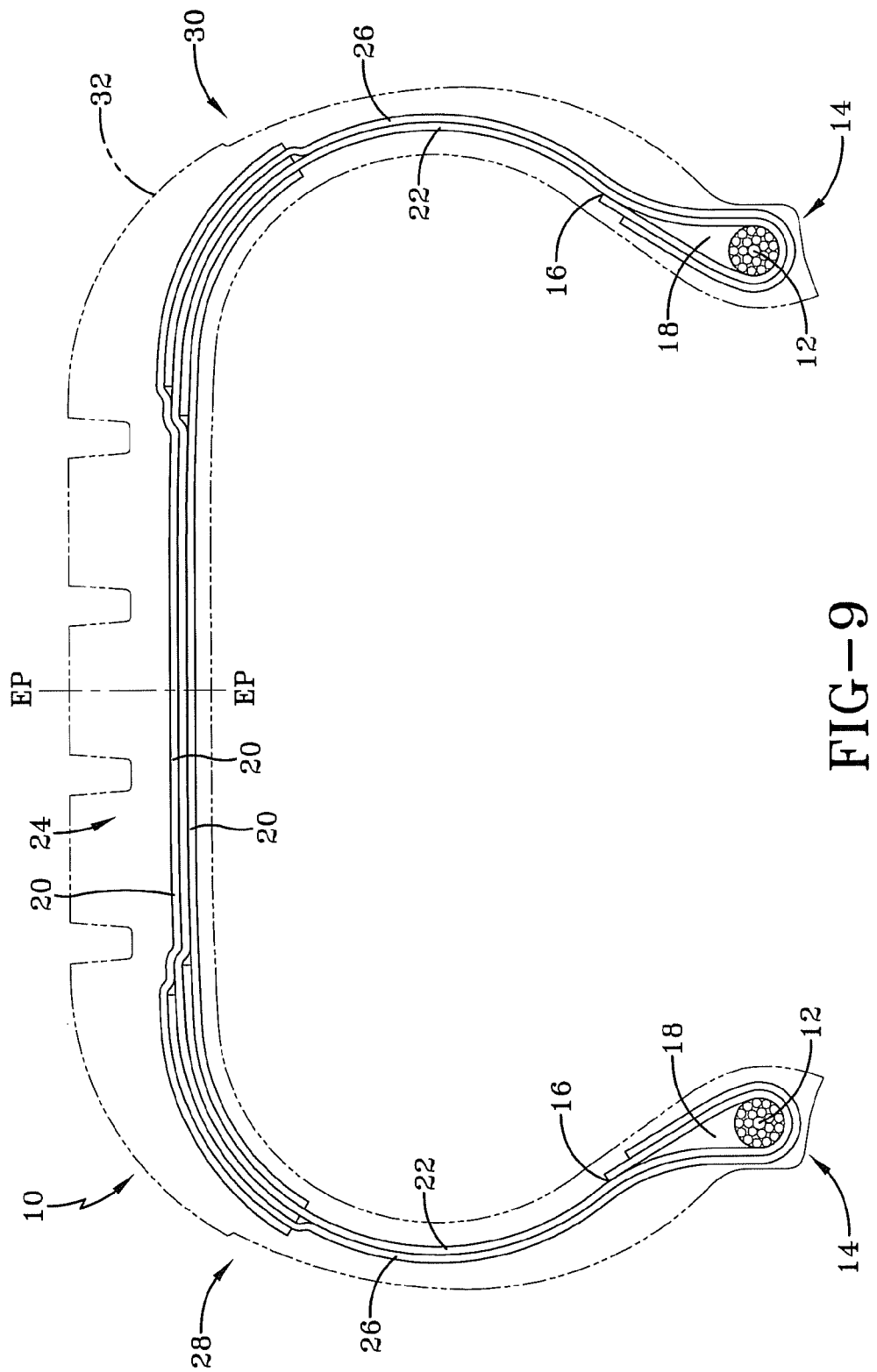
FIG. 9 is a cross-section of the ply-section of a tire, showing one bridge ply on top, one bridge ply in the middle, and one bridge ply on the bottom.
Figure 10:
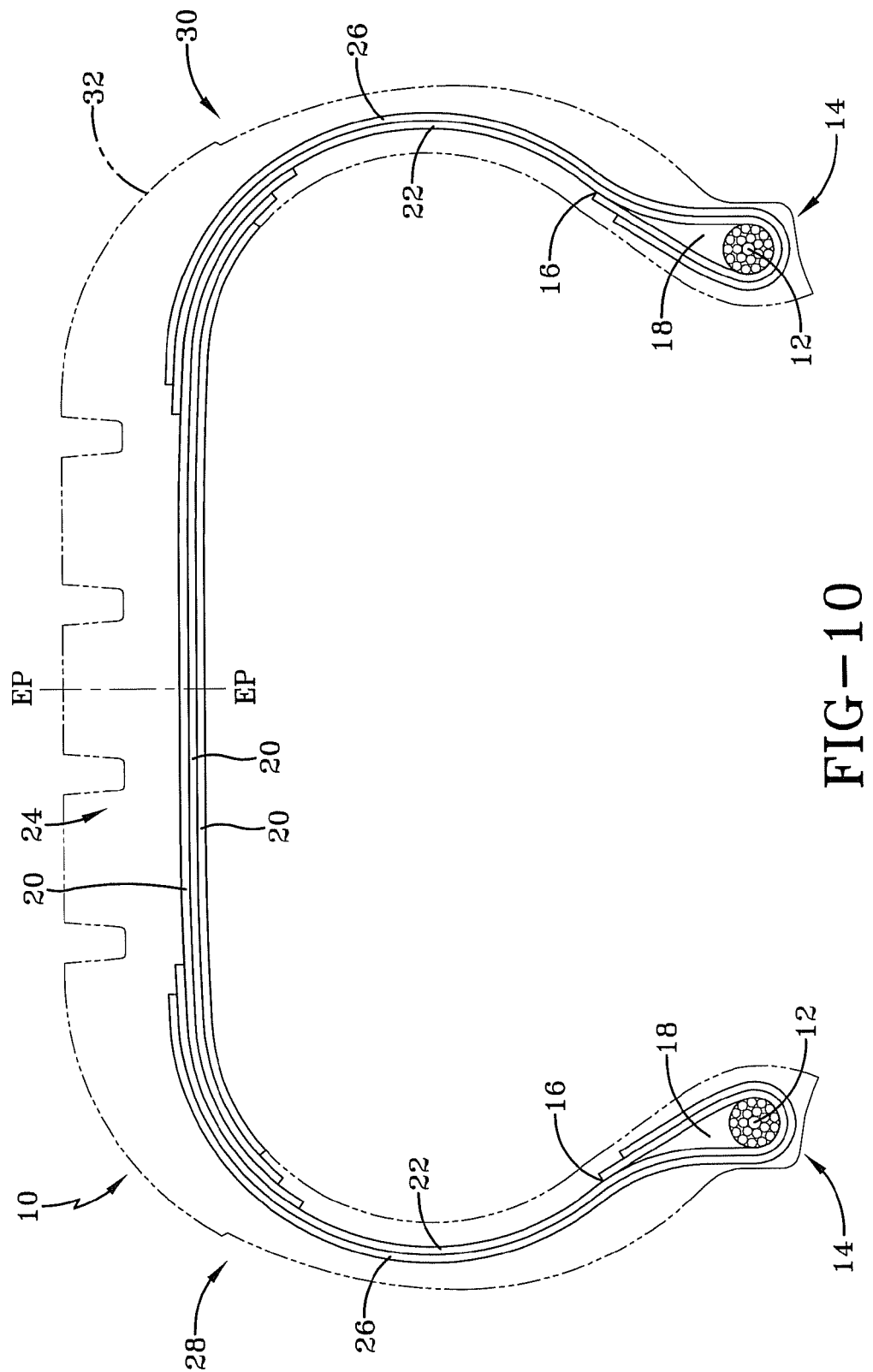
FIG. 10 is a cross-section of the ply-section of a tire, showing three bridge plies on the bottom.
Figure 11:
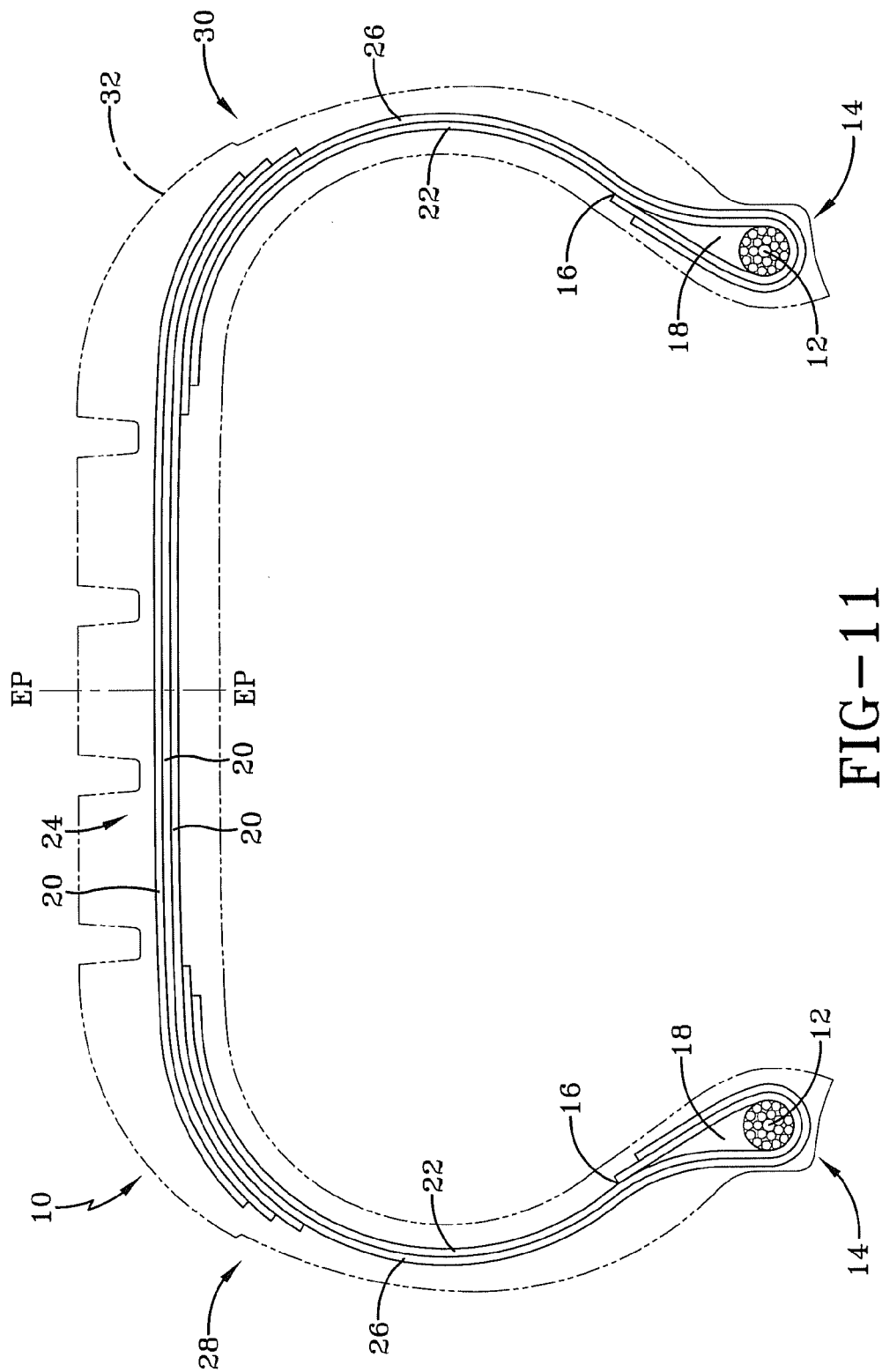
FIG. 11 is a cross-section of the ply-section of a tire, showing three bridge plies on top.
Figure 12:
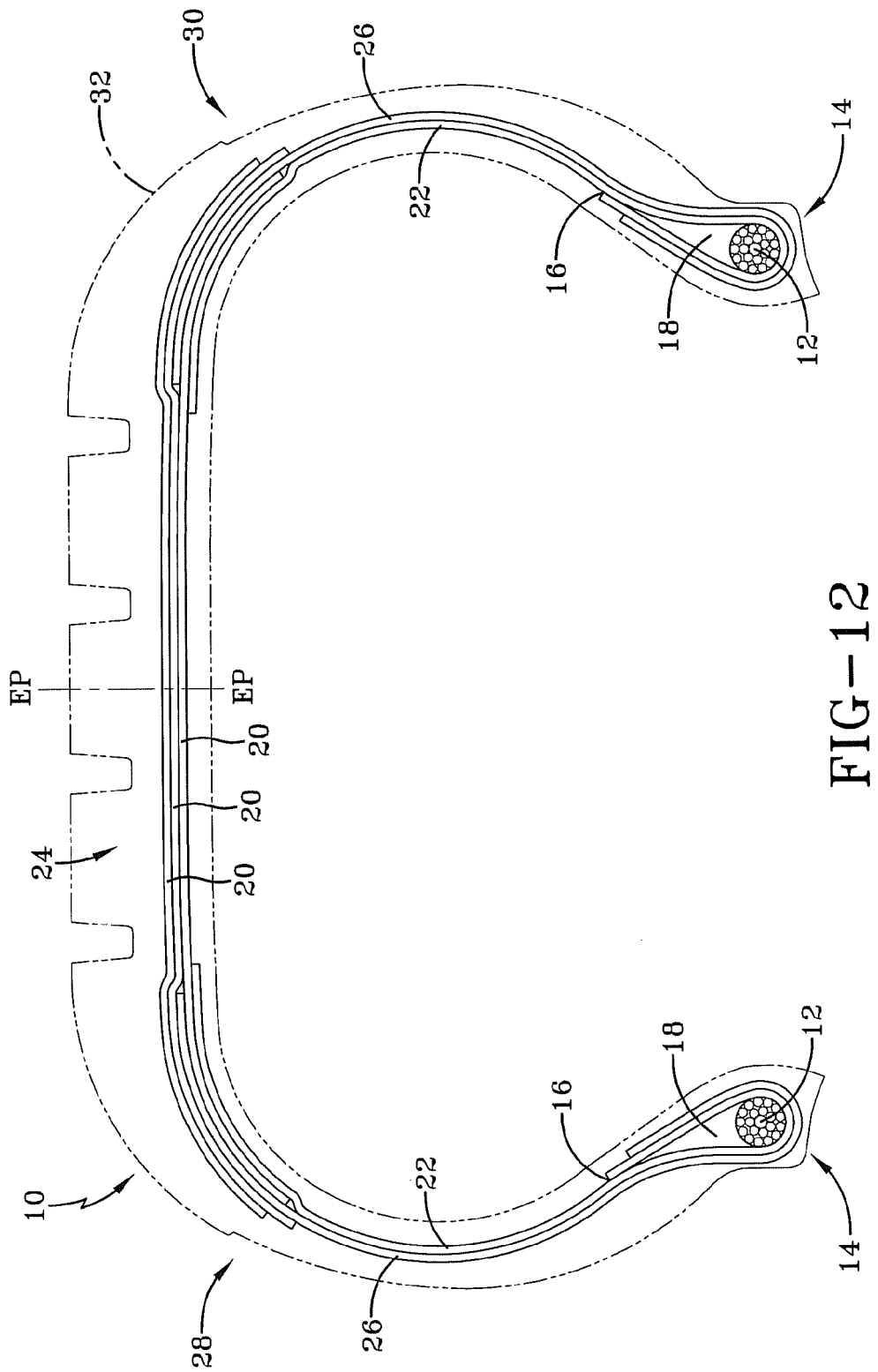
FIG. 12 is a cross-section of the ply-section of a tire, showing two bridge plies on top and one bridge ply in the middle.
Figure 13:
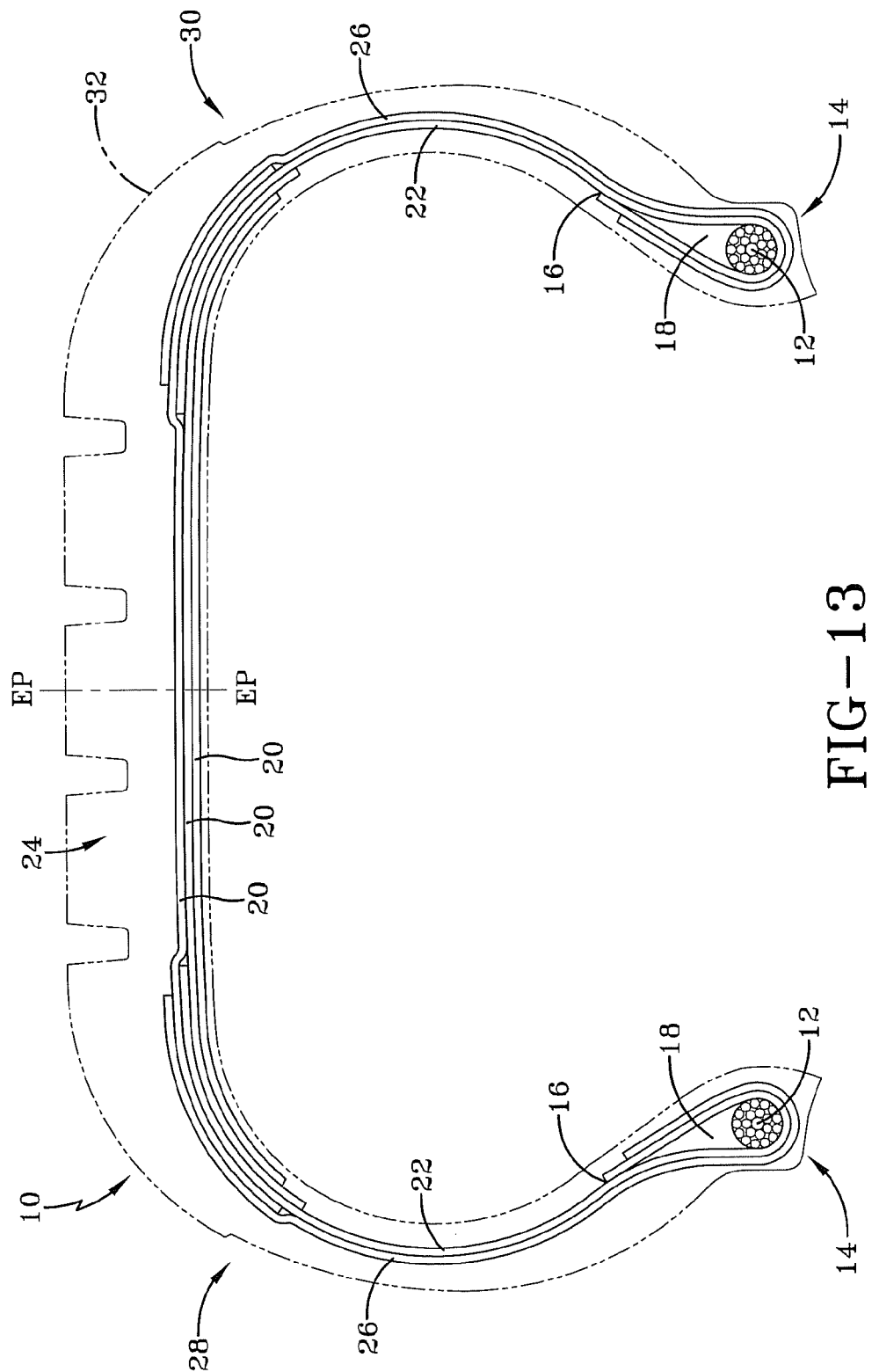
FIG. 13 is a cross-section of the ply-section of a tire, showing two bridge plies on the bottom and one bridge ply in the middle.
Figure 14:
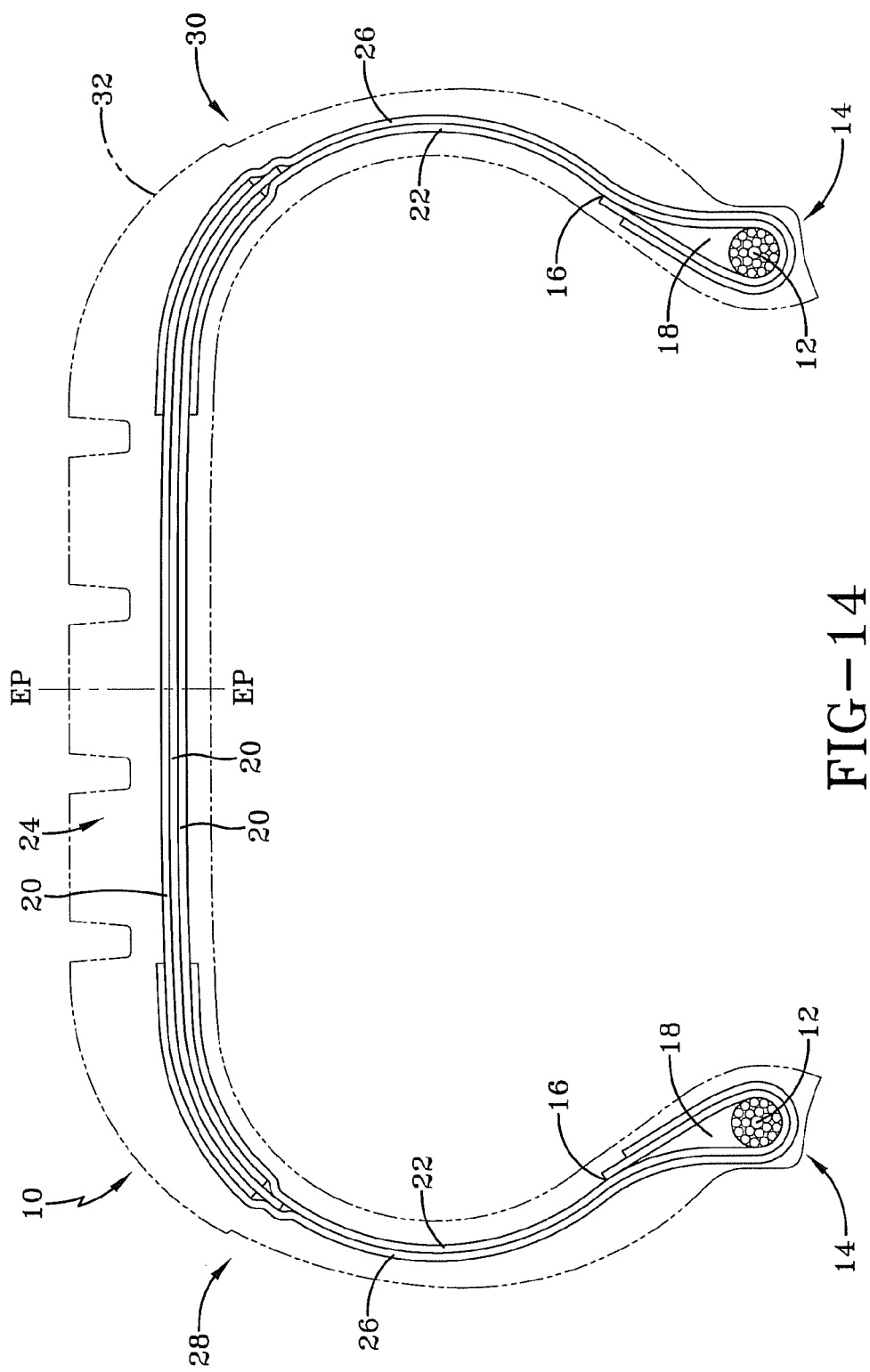
FIG. 14 is a cross-section of the ply-section of a tire, showing three bridge plies in the middle.
Figure 15:
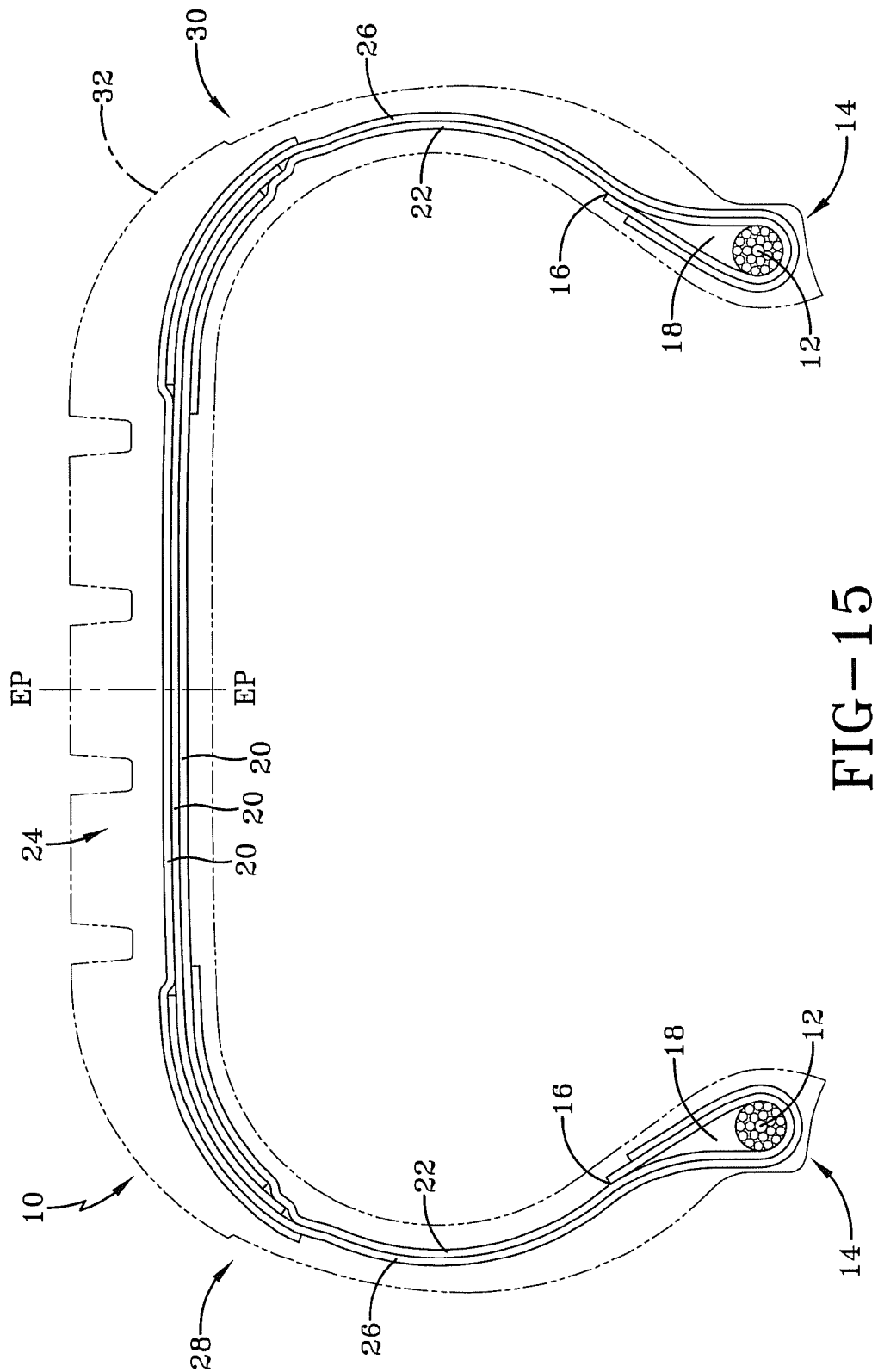
FIG. 15 is a cross-section of the ply-section of a tire, showing two bridge plies in the middle and one bridge ply on top.
Figure 16:
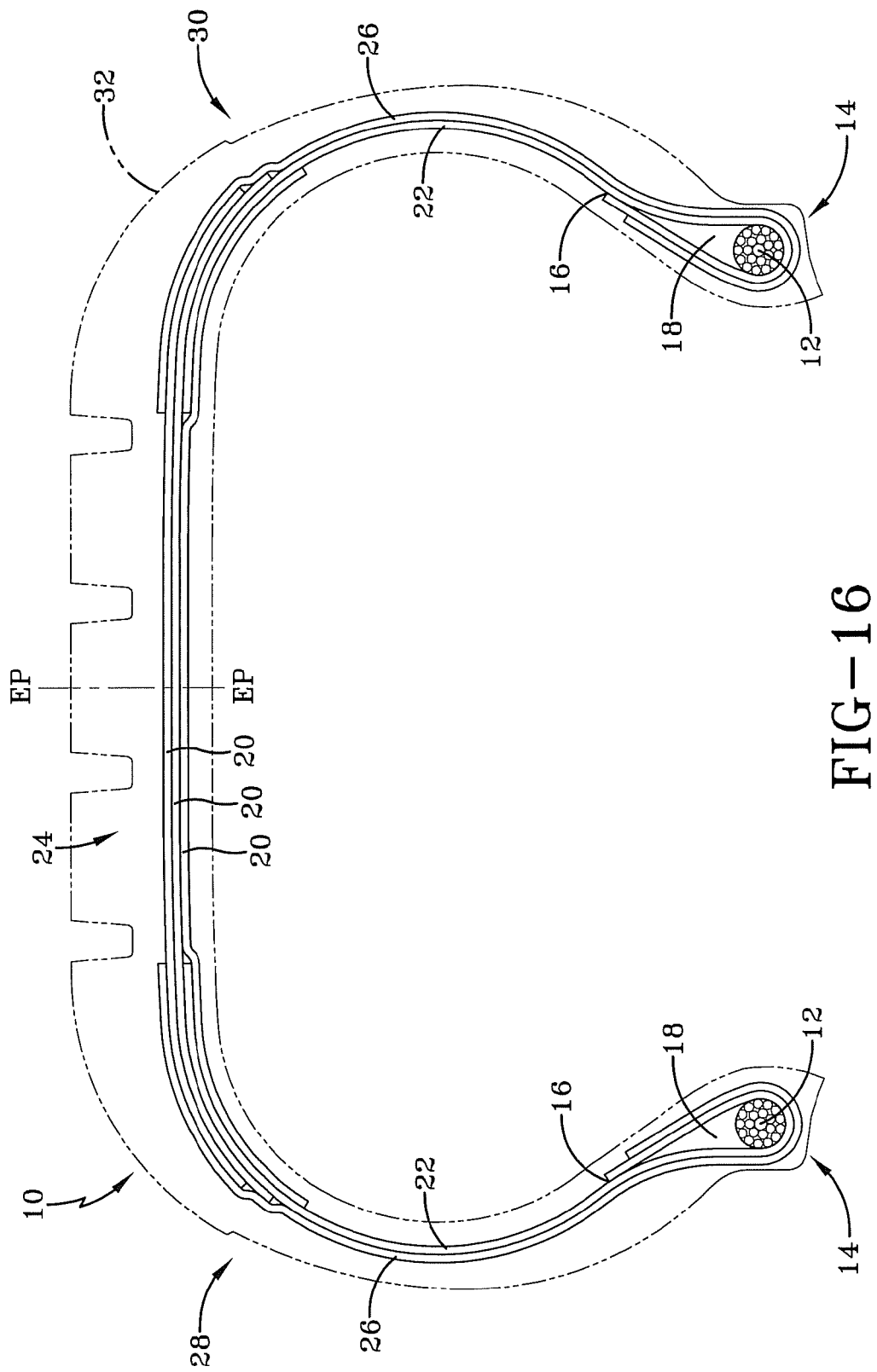
FIG. 16 is a cross-section of the ply-section of a tire, showing two bridge plies in the middle and one bridge ply on the bottom.
Figure 17:
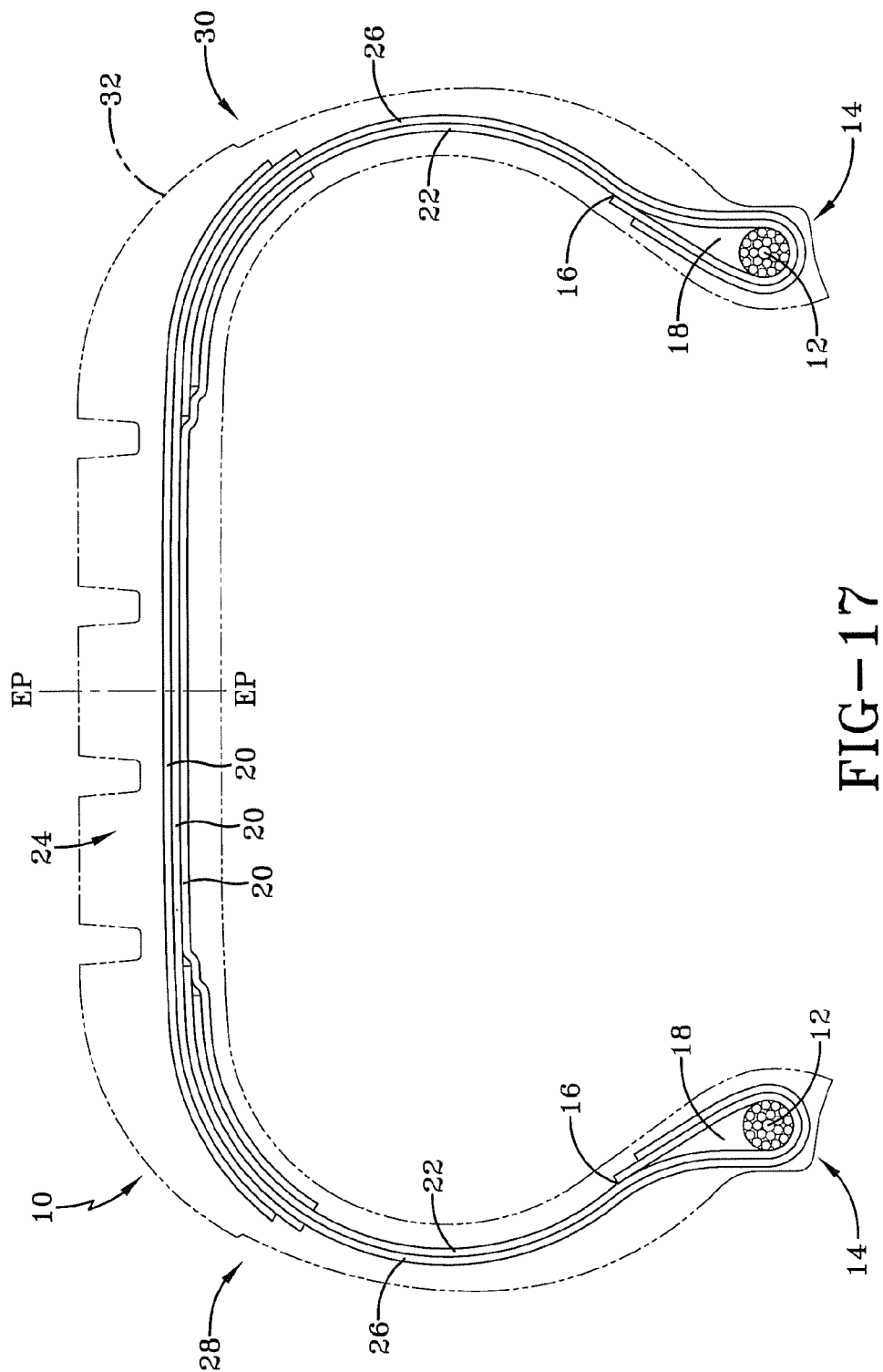
FIG. 17 is a cross-section of the ply-section of a tire, showing two bridge plies on top and one bridge ply on the bottom; and, FIG. 18 is a cross-section of the ply-section of a tire, showing two bridge plies on the bottom and one bridge ply on top.
Figure 18:
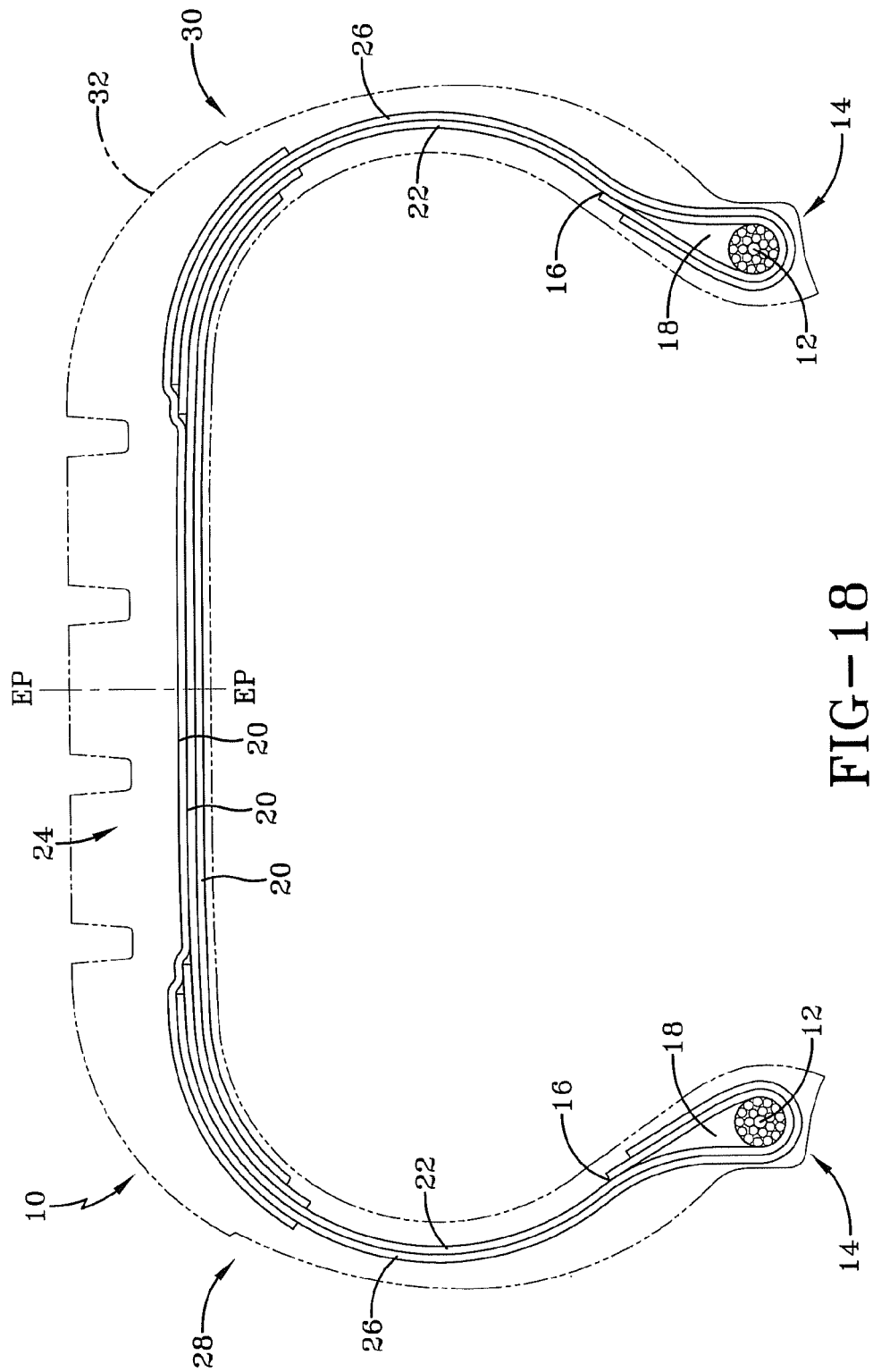

With reference now to FIGS. 9-18, the invention comprises three bridge plies 20 that span the bridge portion 24. In another embodiment of the present invention (as shown in FIG. 9) one bridge ply 20 is on top of the outer sidewall ply 26, one bridge ply 20 is in between the inner and outer sidewall plies 22, 26, and the third bridge ply 20 is underneath the inner sidewall ply 22. In another embodiment of the present invention (as shown in FIG. 10) the bridge plies 20 are underneath the inner sidewall ply 22. In another embodiment of the present invention (as shown in FIG. 11) the bridge plies 20 are on top of the outer sidewall ply 26. In another embodiment of the present invention (as shown in FIG. 12) two of the bridge plies 20 are on top of the outer sidewall ply 26 and one of the bridge plies is in between the inner and outer sidewall plies 22, 26. In another embodiment of the present invention (as shown in FIG. 13) two of the bridge plies 20 are underneath the inner sidewall ply 22 and one of the bridge plies 20 is in between the inner and outer sidewall plies 22, 26. In another embodiment of the present invention (as shown in FIG. 14) the bridge plies 20 are in between the inner and outer sidewall plies 22, 26. In another embodiment of the present invention (as shown in FIG. 15) one of the bridge plies 20 is on top of the outer sidewall ply 26 and two of the bridge plies are in between the inner and outer sidewall plies 22, 26. In another embodiment of the present invention (as shown in FIG. 16) one of the bridge plies 20 is on top of the outer sidewall ply 26 and two of the bridge plies are underneath in the inner sidewall ply 22. In another embodiment of the present invention (as shown in FIG. 17) one of the bridge plies 20 is underneath the inner sidewall ply 22 and two of the bridge plies 20 are on top of the outer sidewall ply 26. In another embodiment of the present invention (as shown in FIG. 18) one of the bridge plies 20 is on top of the outer sidewall ply 26 and two of the bridge plies 20 are underneath the inner sidewall ply 22.

With reference now to FIGS. 3-18, the bridge plies 20 and sidewall plies 22, 26 are typically made of polyester, but the type of material is not intended to be a limitation to this invention, and it is to be understood that the plies 20, 22, 26 could be made of any material chosen using sound engineering judgment. Any combination of angles and materials can be used independently with any of the plies 20, 22, 26.

With continuing reference to FIGS. 3-18, it is to be understood that the bridge plies 20 could extend all of the way down to the bead region 14. It is also to be understood that the invention is not limited to three bridge plies 20, but any number of bridge plies 20 could be used, as long as chosen using sound engineering judgment.

Various embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

What is claimed is:

1. A tire carcass comprising:
a first ply portion;
a second ply portion, each ply portion having an inner sidewall ply, an outer sidewall ply, a first end, a second end, and a bead core, wherein each ply portion extends around the bead core;
a bridge portion, wherein the first ends of the ply portions are separated by the bridge portion; and,
at least three bridge plies each having a first end and a second end, wherein the at least three bridge plies span the bridge portion, wherein the first end of each bridge ply is between the inner sidewall ply and outer sidewall ply of the first ply portion and the second end of each bridge ply is between the inner sidewall ply and outer sidewall ply of the second ply portion, wherein the overlap of the bridge plies and the ply portions is between about one inch and up to the bead core, but not around the bead core.

2. The tire carcass of claim 1, wherein the first and second ends of the at least one bridge ply extend substantially to the bead core.

3. A tire carcass comprising:
a first ply portion;
a second ply portion, each ply portion having an inner sidewall ply, an outer sidewall ply, a first end, a second end, and a bead core, wherein each ply portion extends around the bead core;
a bridge portion, wherein the first ends of the ply portions are separated by the bridge portion; and
at least one bridge ply, wherein the at least one bridge ply spans the bridge portion, wherein the first and second ends of the at least one bridge ply extend substantially to the bead core, but not around the bead core;

wherein the tire carcass further comprises one from the group comprising:

(i) the at least one bridge ply is at least two bridge plies, the bridge plies being layered on top of each other, wherein the bridge plies are on top of the outer sidewall ply;

(ii) the at least one bridge ply is at least two bridge plies, wherein the bridge plies are between the inner and outer sidewall plies;

(iii) the at least one bridge ply is at least two bridge plies, wherein the bridge plies are layered on top of each other, wherein the bridge plies are underneath the inner sidewall ply;

(iv) the at least one bridge ply is at least two bridge plies, wherein at least one of the bridge plies is on top of the outer sidewall ply and at least one of the bridge plies is in between the inner and outer sidewall plies;

(v) the at least one bridge ply is at least two bridge plies, wherein at least one of the bridge plies is on top of the outer sidewall ply and at least one of the bridge plies is underneath the inner sidewall ply;

(vi) the at least one bridge ply is at least two bridge plies, wherein at least one of the bridge plies is in between the inner and outer sidewall plies and at least one of the bridge plies is underneath the inner sidewall ply;

(vii) the at least one bridge ply is at least three bridge plies, wherein at least one bridge ply is on top of the outer sidewall ply, at least one bridge ply in between the inner and outer sidewall plies, and at least one bridge ply is underneath the inner sidewall ply;

(viii) the at least one bridge ply is at least three bridge plies, wherein the bridge plies are layered on top of each other, wherein the bridge plies are on top of the outer sidewall ply;

(ix) the at least one bridge ply is at least three bridge plies, wherein the bridge plies are layered on top of each other, wherein the bridge plies are underneath the inner sidewall ply;

(x) the at least one bridge ply is at least three bridge plies, wherein at least two of the bridge plies are on top of the outer sidewall ply and at least one of the bridge plies is in between the inner and outer sidewall plies;

(xi) the at least one bridge ply is at least three bridge plies, wherein at least two of the bridge plies are on top of the outer sidewall ply and at least one of the bridge plies is underneath the inner sidewall ply;

(xii) the at least one bridge ply is at least three bridge plies, wherein at least two of the bridge plies are in between the inner and outer sidewall plies and at least one of the bridge plies is underneath the inner sidewall ply;

(xiii) the at least one bridge ply is at least three bridge plies, wherein at least two of the bridge plies are in between the inner and outer sidewall plies and at least one of the bridge plies is on top of the outer sidewall ply, (xiv) the at least one bridge ply is at least three bridge plies, wherein at least two of the bridge plies are underneath the inner sidewall ply and at least one of the bridge plies is in between the inner and outer sidewall plies; and (xv) the at least one bridge ply is at least three bridge plies, wherein at least two of the bridge plies are underneath the inner sidewall ply and at least one of the bridge plies is on top of the outer sidewall plies.

4. The tire carcass of claim 3, wherein the at least one bridge ply is at least two bridge plies, the bridge plies being layered on top of each other, wherein the bridge plies are on top of the outer sidewall ply.

5. The tire carcass of claim 3, wherein the at least one bridge ply is at least two bridge plies, wherein the bridge plies are between the inner and outer sidewall plies.

6. The tire carcass of claim 3, wherein the at least one bridge ply is at least two bridge plies, wherein the bridge plies are layered on top of each other, wherein the bridge plies are underneath the inner sidewall ply.

7. The tire carcass of claim 3, wherein the at least one bridge ply is at least two bridge plies, wherein at least one of the bridge plies is on top of the outer sidewall ply and at least one of the bridge plies is in between the inner and outer sidewall plies.

8. The tire carcass of claim 3, wherein the at least one bridge ply is at least two bridge plies, wherein at least one of the bridge plies is on top of the outer sidewall ply and at least one of the bridge plies is underneath the inner sidewall ply.

9. The tire carcass of claim 3, wherein the at least one bridge ply is at least two bridge plies, wherein at least one of the bridge plies is in between the inner and outer sidewall plies and at least one of the bridge plies is underneath the inner sidewall ply.

10. The tire carcass of claim 3, wherein the at least one bridge ply is at least three bridge plies, wherein at least one bridge ply is on top of the outer sidewall ply, at least one bridge ply in between the inner and outer sidewall plies, and at least one bridge ply is underneath the inner sidewall ply.

11. The tire carcass of claim 3, wherein the at least one bridge ply is at least three bridge plies, wherein the bridge plies are layered on top of each other, wherein the bridge plies are on top of the outer sidewall ply.

12. The tire carcass of claim 3, wherein the at least one bridge ply is at least three bridge plies, wherein the bridge plies are layered on top of each other, wherein the bridge plies are underneath the inner sidewall ply.

13. The tire carcass of claim 3, wherein the at least one bridge ply is at least three bridge plies, wherein at least two of the bridge plies are on top of the outer sidewall ply and at least one of the bridge plies is in between the inner and outer sidewall plies.

14. The tire carcass of claim 3, wherein the at least one bridge ply is at least three bridge plies, wherein at least two of the bridge plies are on top of the outer sidewall ply and at least one of the bridge plies is underneath the inner sidewall ply.

15. The tire carcass of claim 3, wherein the at least one bridge ply is at least three bridge plies, wherein at least two of the bridge plies are in between the inner and outer sidewall plies and at least one of the bridge plies is underneath the inner sidewall ply.

16. The tire carcass of claim 3, wherein the at least one bridge ply is at least three bridge plies, wherein at least two of the bridge plies are in between the inner and outer sidewall plies and at least one of the bridge plies is on top of the outer sidewall ply.

17. The tire carcass of claim 3, wherein the at least one bridge ply is at least three bridge plies, wherein at least two of the bridge plies are underneath the inner sidewall ply and at least one of the bridge plies is in between the inner and outer sidewall plies.

18. The tire carcass of claim 3, wherein the at least one bridge ply is at least three bridge plies, wherein at least two of the bridge plies are underneath the inner sidewall ply and at least one of the bridge plies is on top of the outer sidewall plies.

19. A tire carcass comprising:
a first ply portion;
a second ply portion, each ply portion having an inner sidewall ply, an outer sidewall ply, a first end, a second end, and a bead core, wherein each ply portion extends around the bead core;
a bridge portion, wherein the first ends of the ply portions are separated by the bridge portion; and
at least two bridge plies, wherein the at least two bridge plies span the bridge portion, wherein the first and second ends of the at least two bridge plies extend substantially to the bead core, but not around the bead core.

20. The tire carcass of claim 19, further comprising three bridge plies, wherein the three bridge plies spans the bridge portion, wherein the first and second ends of the three bridge plies extend substantially to the bead core, but not around the bead core.

* * * * *